United States Patent
Farfade et al.

(10) Patent No.: US 8,300,697 B2
(45) Date of Patent: Oct. 30, 2012

(54) DYNAMIC MOTION VECTOR ANALYSIS METHOD

(75) Inventors: Sachin Sudhakar Farfade, Bangalore (IN); Satendra Pal Singh, Bangalore (IN); Kiran Rajaram, Bangalore (IN); Abhay Sharma, Bangalore (IN)

(73) Assignee: Allgo Embedded Systems Private Limited., Karnataka (IN)

( * ) Notice: Subject to any disclaimer, the term of this patent is extended or adjusted under 35 U.S.C. 154(b) by 366 days.

(21) Appl. No.: 12/451,294

(22) PCT Filed: Apr. 8, 2008

(86) PCT No.: PCT/IN2008/000229
§ 371 (c)(1),
(2), (4) Date: Nov. 5, 2009

(87) PCT Pub. No.: WO2008/139489
PCT Pub. Date: Nov. 20, 2008

(65) Prior Publication Data
US 2010/0098165 A1    Apr. 22, 2010

(30) Foreign Application Priority Data
May 10, 2007   (IN) .................. 00998/CHE/2007

(51) Int. Cl.
*H04N 7/36* (2006.01)
(52) U.S. Cl. .................. 375/240.16; 375/240.24
(58) Field of Classification Search ............. 375/240.16, 375/240.24
See application file for complete search history.

(56) References Cited

U.S. PATENT DOCUMENTS

| | | | |
|---|---|---|---|
| 6,369,855 B1 | 4/2002 | Chauvel et al. | |
| 6,373,893 B1 * | 4/2002 | Midorikawa | 375/240.16 |
| 6,876,702 B1 | 4/2005 | Hui et al. | |
| 2004/0095998 A1 | 5/2004 | Luo et al. | |
| 2005/0262276 A1 | 11/2005 | Singh et al. | |
| 2006/0018383 A1 * | 1/2006 | Shi et al. | 375/240.16 |
| 2006/0120613 A1 * | 6/2006 | Su et al. | 382/236 |

FOREIGN PATENT DOCUMENTS

WO   WO 2005/034516 A1   4/2005

OTHER PUBLICATIONS

Wang et al., "Motion Compensation Memory Access Optimization Strategies for H.264/AVC Decoder," *IEEE Conference on Acoustics, Speech, and Signal Processing*, vol. 5, pp. 97-100, 2005.
International Search Report issued in International Application No. PCT/IN2008/000229; Mailed on Jul. 24, 2008.

* cited by examiner

*Primary Examiner* — Sath V Perungavoor
*Assistant Examiner* — Jeffery Williams
(74) *Attorney, Agent, or Firm* — Oliff & Berridge, PLC

(57) ABSTRACT

The proposed Dynamic Motion Vector Analysis method applies to the motion compensation module of a video decoder system. The method analyzes the motion-vectors of a given region of picture frame and outputs a set of regions to be fetched from the reference frames stored in the external memory. The size and number of regions are decided by a hierarchical method that uses a set of user-defined input thresholds. Pre-processing of the motion vectors associated with the given region allows the method to handle reference data to be fetched from multiple reference frames in the same framework. A complementary dynamic batch (region of operation) size strategy that works along with MV-analysis is also proposed to help utilize the on-chip memory resources more efficiently.

12 Claims, 3 Drawing Sheets

DYNAMIC MOTION VECTOR ANALYSIS METHOD

FIELD OF THE INVENTION

The present invention relates to a method to optimize bandwidth requirements and on-chip memory usage by Dynamic Motion Vector Analysis for motion compensation based video decoder systems and apparatus thereof.

BACKGROUND OF THE INVENTION

In motion-compensation methods, previously decoded frame data (called reference data) is required while decoding the current frame. Since on-chip memory is a precious resource, even for moderate size frames it is required to store reference (previously decoded) frames in the external memory. When required by motion compensation methods this data needs to be fetched from external memory and this leads to additional bandwidth requirement on the interface. The data to be referenced by adjacent regions can have some overlap and if by having some extra on-chip memory this overlap can be exploited then it reduces some bandwidth at the expense of some on-chip memory. For higher frame sizes the bandwidth overhead can be prohibitive and it necessitates having a significant on-chip memory for the reference frames. A method, called Dynamic MV-Analysis, which defines a reference-data fetch strategy is proposed. This method dynamically achieves a balance between external memory interface bandwidth requirement and on-chip memory requirement thus leading to significant savings by exploiting data overlaps and reducing redundant loads.

While referencing data from pervious frames multiple scenarios can be there. A few of these are:
  Current data blocks referencing overlapping data from previous frames as is the case in low motion frames.
  Current data blocks referencing non-overlapping (reference regions far apart) regions. This will be the case in high motion frames with large motion vectors.
  Current data blocks referencing regions from multiple reference frames.

Each of the above scenarios will have a different fetch strategy to meet the bandwidth and the on-chip memory constraints. E.g in the first scenario it will be beneficial to fetch one big region that contains all the data for current blocks to be processed. However, in the second scenario it will lead to the fetch of a much bigger region than required and lead to high bandwidth and storage requirement.

The basic idea of 'Dynamic MV-Analysis' is to exploit overlaps in the data to be fetched and also reduce the redundant data to be fetched. This is achieved by adapting the fetch strategy according to the data characteristics by analyzing the motion vectors for a given region. A recursive analysis of fetch strategy is introduced to make the method more robust in case of out-lier motion vectors (a few motion vectors being very different from others in the set). The method also takes care of scenarios where the data is to be fetched from multiple reference frames. Size of the region being worked upon is changed dynamically, based on results of motion vector analysis, to efficiently utilize the available on-chip memory.

OBJECTS OF THE INVENTION

The primary object of the present invention is to exploit overlaps in the data to be fetched and also reduce the redundant data to be fetched.

Yet another object of the present invention is to provide a method and apparatus to optimize bandwidth requirements and on-chip memory usage by Dynamic Motion Vector Analysis for motion compensation based video decoder systems.

Still another object of the present invention is to analyze the motion-vectors of a given region of picture frame and output a set of regions to be fetched from the reference frames stored in the external memory.

Still another object of the present invention is the pre-processing of the motion vectors associated with the given region that allows the method to determine reference data fetches from multiple reference frames in the same framework.

Still another object of the present invention is the method dynamically changes operating batch sizes as per the requirement to optimize the on-chip memory usage.

STATEMENT OF INVENTION

Accordingly the present invention provides a method to optimize bandwidth requirements and on-chip memory usage by Dynamic Motion Vector Analysis for motion compensation based video decoder system, said method comprising steps of; providing region for which data is to be fetched; identifying reference region from the regions stored in external memory using motion vectors, consisting pre-processing motion vectors to determine reference data fetches from multiple reference frames; identifying smallest overlap region for each of the reference data blocks; comparing the overlap region with predetermined threshold; and fetching the regions having value less than the threshold and dividing the regions having value more than the threshold into sub-regions and repeating the steps of identifications, comparing and fetching, till each region cannot be further sub-divided, and also an apparatus to optimize bandwidth requirements and on-chip memory usage by Dynamic Motion Vector Analysis for motion compensation based video decoder systems, said apparatus comprises means for providing motion vector information; motion Vector analysis engine to exploit overlap regions in the data to be fetched and also to reduce the redundant data to be fetched; dynamic Memory Access (DMA) to fetch reference data from external memory and to process the transfer requests sequentially; motion compensation module; and on-chip memory to store the reference data.

BRIEF DESCRIPTION OF THE ACCOMPANYING DRAWINGS

The invention will be described in greater detail below in connection with accompanying drawing figures, in which.

DETAILED DESCRIPTION OF THE INVENTION

Figure 1:
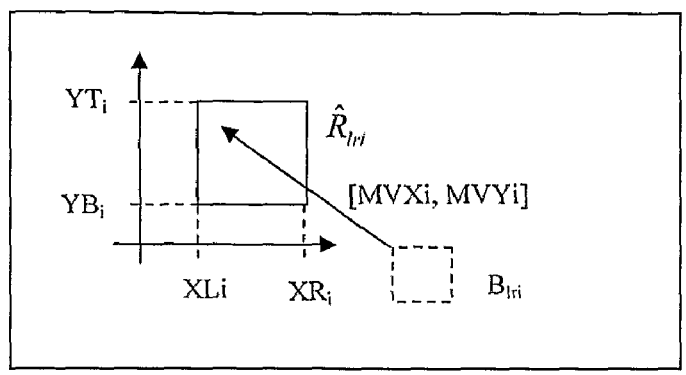
FIG. 1 shows the coordinates of the reference region to be fetched, $\hat{R}_{l^ri}$, corresponding to each $B_{l^ri}$ in a given region.

The primary embodiment of the present invention is a method to optimize bandwidth requirements and on-chip memory usage by Dynamic Motion Vector Analysis for motion compensation based video decoder systems, said method comprising steps of; providing region for which data is to be fetched; identifying reference region from the regions stored in external memory using motion vectors, consisting pre-processing motion vectors to determine reference data fetches from multiple reference frames; identifying smallest overlap region for each of the reference data blocks; comparing the overlap region with predetermined threshold; and fetching the regions having value less than the threshold and dividing the regions having value more than the threshold into sub-regions and repeating the steps of identifications, comparing, and fetching till each region cannot be further subdivided.

In yet another embodiment of the present invention, the size and number of the regions depends upon a set of predetermined thresholds.

In still another embodiment of the present invention, the method which provides for means to trade-off between external interface bandwidth requirement and the number of data fetches for a given amount of on-chip memory in a system.

In still another embodiment of the present invention, the set of thresholds and region partitioning strategy is adaptable to the application data processed.

In still another embodiment of the present invention, the method dynamically changes operating batch sizes as per the requirement.

In still another embodiment of the present invention, the method provides a dynamic balance between external memory interface bandwidth requirement and on-chip memory requirement.

In still another embodiment of the present invention, the batch comprises plurality of macro-blocks.

In still another embodiment of the present invention, the operating region and the sub-region are rectangular blocks of data in a picture frame.

In still another embodiment of the present invention, the method automatically decides and fetches the referencing data from previous frames under multiple scenarios selected from a group comprising
 a current data blocks referencing overlapping data from previous frames;
 b current data blocks referencing non-overlapping regions; and
 c current data blocks referencing regions from multiple reference frames.

In still another embodiment of the present invention, the method is implemented onto a single core and/or multi-core embedded platforms.

In still another embodiment of the present invention, is an apparatus to optimize bandwidth requirements and on-chip memory usage by Dynamic Motion Vector Analysis for motion compensation based video decoder system, said apparatus comprises means for providing motion vector information; motion Vector analysis engine to exploit overlap regions in the data to be fetched and also to reduce the redundant data to be fetched; dynamic Memory Access (DMA) to fetch reference data from external memory and to process the transfer requests sequentially; motion compensation module; and on-chip memory to store the reference data.

In still another embodiment of the present invention, the apparatus is part of motion compensation module of H.264 decoder.

The proposed method/procedure applies to the motion compensation module of a video decoder system.

The method analyzes the motion-vectors of a given region of picture frame and outputs a set of regions to be fetched from the reference frames stored in the external memory. The size and number of regions are decided by a hierarchical method that uses a set of user-defined input thresholds. Pre-processing of the motion vectors associated with the given region allows the method to fetch reference data from multiple reference frames in the same framework. A complementary dynamic batch (region of operation) size strategy that works along with MV-analysis is also proposed to help utilize the on-chip memory resources more efficiently.

An example adaptation of the above method to the motion compensation module of a H.264 decoder implementation is also provided.

We first introduce notation and terminology followed by generic description of method. A region/sub-region is defined as a rectangular block of data in a picture frame. A region/sub-region is described by: start position in pixels (x, y) and size of the region (width and height in pixels).

Let B denote the smallest region for which a motion-vector is available. In the context of this method all regions will consist of integer number of Bs.

The proposed method is a recursive method and it works with a hierarchical set of regions. On the highest level, the method starts with one region (also called the batch). As we progress to the lower level if required for a given region in the higher level, it is partitioned into multiple contiguous sub-regions and the method works on each of the sub-regions in the partition. This recursion continues until the method reaches the lowest level where each region cannot be further sub-divided. This implies that at the lowest level each sub-region size is equal to B. To describe the sub-regions at each level following notation is introduced:

Let L denote the total number of levels and $N_l$ denote the number of sub-regions on a level l and $\{R_{lr}\}_{r=0}^{N_l}$ denote a sequence of sub-regions for a given level l. At the highest level $N_l=1$ and let this region be denoted by $R_L$ (batch). Let $M_{lr}$ denote the number of motion vectors available for a given region $R_{lr}$. Let $\{B_{lri}\}_{i=0}^{M_{lr}}$ denote a sequence of Bs (smallest data units for which motion vector is available) contained in a sub-region r for a given level l. Let $\{\hat{R}_{lri}\}_{i=0}^{M_{lr}}$ denote the corresponding sequence of data sub-regions (one for each basic block in $\{B_{lri}\}$) in reference frames for a given region $R_{lr}$. And $\{MV_{lri}\}_{i=0}^{M_{lr}}$ denotes the set of motion-vectors associated with each block in the set $\{B_{lri}\}$.

Let $N_B$ denote the number of Bs contained in the region at the highest level ($R_L$). As it follows from above, $$N_B = \sum_{r=0}^{N_l} M_{lr}$$

and is same for any level.

Let $RO_{lr}$ denote the smallest region containing all sub-regions in $\{\hat{R}_{lri}\}$. Let $T_l$ denote a threshold in terms of 'region size' for a given level l.

Let RegToBeFetched[ ] be a global array that contains the regions to be fetched from reference frames.

MV-Analysis Method

Table 1 describes the high level pseudo-code for the MV-Analysis method. It is assumed that the partitions of region at each level ($N_l$ and the size of each sub-region) are known and the thresholds ($T_l$) are also known. Thresholds and region partitioning strategy depend upon the application data and might need separate fine-tuning for each case.

The input to this method is one single region (batch) for which data has to be fetched. The output of the method is a set of regions belonging to different reference frames that need to be fetched from external memory. The main modules of this method are:

FindRefRegion: This function uses the motion vectors and finds out the set of $\{\hat{R}_{lri}\}$ corresponding to a given $R_{lr}$. This function utilizes the input motion vector set ($\{MV_{lri}\}$) for $R_{lr}$. An important feature of this function is the pre-processing step for motion vectors to facilitate handling of the scenarios where reference data belongs to different reference frames.

FindOverlapRegion: This function finds the smallest overlapping rectangular region, $RO_{lr}$, containing all the regions in $\{\hat{R}_{lri}\}$.

Comparison with threshold that leads the method to invoke recursion into the next level if required.

TABLE 1

FindFetchRegions($R_{lr}$, l, r)
{
    /* Find reference regions by using motion vectors */
    $\{\hat{R}_{lri}\}$ = FindRefRegion ($R_{lr}$, $\{MV_{lri}\}$);
    /* Find the smallest overlap region for each of reference data blocks */
    $RO_{lr}$ = FindOverlapRegion($\{\hat{R}_{lri}\}$);
    /* Compare with threshold */
    if (size($RO_{lr}$) < $T_l$)   //Region is ok to be fetched
    {
        /* Found the region to be fetched. Append it to the
        global array */
        FetchRegions = [FetchRegions, $RO_{lr}$];
    }
    else       //Region not ok to be fetched. Recurse into sub-regions
    {
        l--;
        for (r=0; r < $N_l$; r++)
        {
            FindFetchRegions ($R_{lr}$, l, r);
        }
    }
}

Table 2 describes the high level Pseudo-code for finding out reference regions to be fetched and for finding overlap regions

TABLE 2

FindRefRegions finds the coordinates of the reference region to be fetched, $\hat{R}_{lri}$, corresponding to each $B_{lri}$ in a given region (shown in FIG. 1)
FindRefRegion ($R_{lr}$, $\{MV_{lri}\}$)
{
    for (i=0; i < $M_{lr}$; i++)
    {
        // Start coordinates Of $B_{lri}$ is given by: [$XB_{lri}$, $YB_{lri}$]
        // Function F(Reference_Frame_IDX) is offset added
        // based on the reference frame index to automatically
        // take care of multiple reference frame data fetch
        MVX_tmp = MVXi + $XB_{lri}$ + F(Reference_Frame_IDX);
        MVY_tmp = MVYi + $YB_{lri}$;
        // C1 and C2 are constants that depend upon the interpolation filter used
        // motion compensation. For H.264 decoder implementation C1 = 2 &C2 = 6
        $XL_{lri}$ = MVX_tmp − C1;    //X start coordinates for $\hat{R}_{lri}$
        $XR_{lri}$ = MVX_tmp + C2;   //X end coordinates for $\hat{R}_{lri}$
        $YB_{lri}$ = MVY_tmp − C1;    //Y start coordinates for $\hat{R}_{lri}$
        $YT_{lri}$ = MVY_tmp + C2;   //Y end coordinates for $\hat{R}_{lri}$
    }
}
// Finds the left, right, top, bottom coordinate for the overlap region $RO_{lr}$ for $\{\hat{R}_{lri}\}$
FindOverlapRegion($\{\hat{R}_{lri}\}$)
{
    RO_XL = min ( $\{XL_{lri}\}_{i=0}^{M_{lr}}$); //$\{XL_{lri}\}_{i=0}^{M_{lr}}$ calculated in the function FindRefRegion
    RO_XR = max ($\{XR_{lri}\}_{i=0}^{M_{lr}}$); //$\{XR_{lri}\}_{i=0}^{M_{lr}}$ calculated in the function FindRefRegion
    RO_YB = min ( $\{YB_{lri}\}_{i=0}^{M_{lr}}$); // $\{YB_{lri}\}_{i=0}^{M_{lr}}$ calculated in the function FindRefRegion
    RO_YT = max ($\{YT_{lri}\}_{i=0}^{M_{lr}}$); // $\{YT_{lri}\}_{i=0}^{M_{lr}}$ calculated in the function FindRefRegion
}

Figure 2:
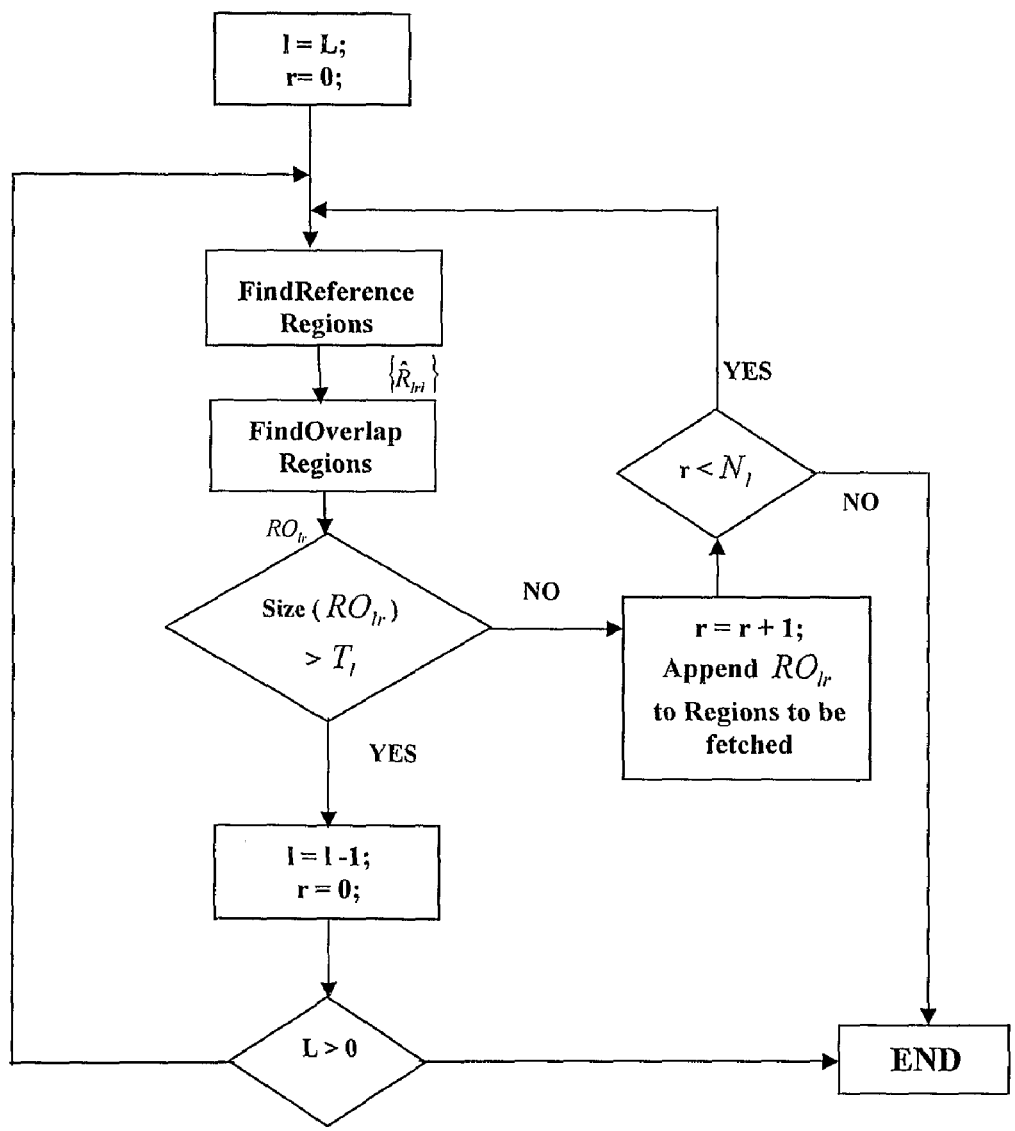
FIG. 2 shows flow chart for MV-analysis method.

Flow chart for MV-Analysis method is shown in FIG. 2.

The maximum on-chip memory requirement for reference data fetch by using the MV-analysis method is given by:

$$\max\left[\left\{\sum_{i=0}^{N_B} \text{size } (\hat{R}_{L0i})\right\}, \{T_l\}_{l=0}^L\right]$$

Typically, the worst case requirement will be equal to upon the sum of sizes of all the reference regions present in the region at the highest level, $R_L$. Thus the size of $R_L$ defines the worst case requirements for the on-chip memory to store the reference data. With a given memory requirement, sequence of thresholds are key parameters that balance the total external bandwidth as well as the number of regions to be fetched. Number of regions to be fetched can be critical in scenarios where DMA is being used to fetch data from external memory. It is a well known fact that DMAs are one of the most critical functional units in most of embedded decoder implementation platforms. Threshold values need to be carefully chosen and typically need fine-tuning for different data sets.

Figure 3:
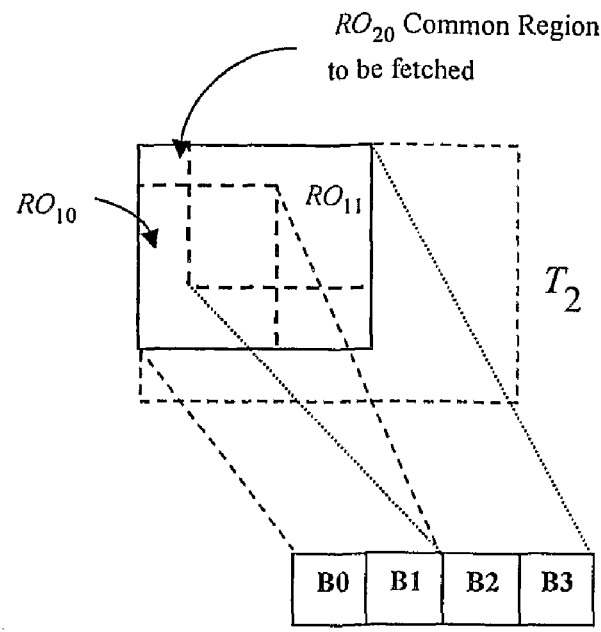
FIG. 3 shows example of scenario where there is a lot of overlap in data to be fetched.
Figure 4:
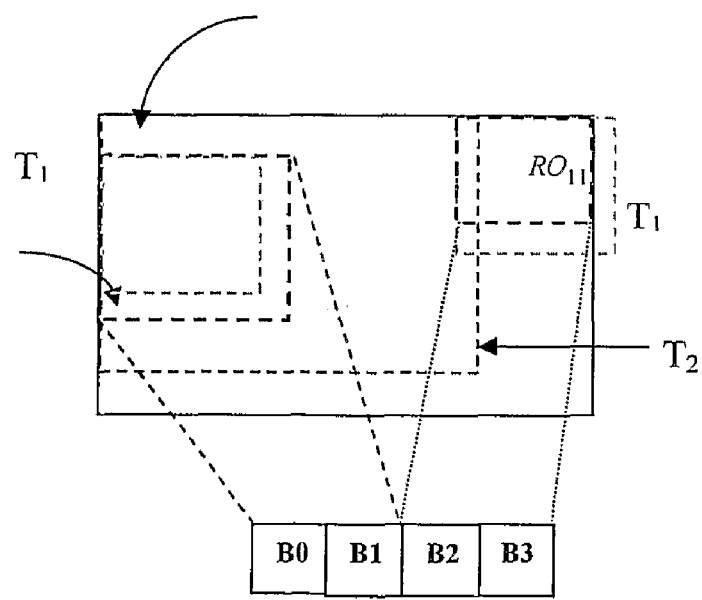
FIG. 4 shows example of scenario where recursion is invoked by MV-analysis method.

FIG. 3 and FIG. 4 describe two illustrative examples into the functioning of this method. In FIG. 3, a scenario is presented when there is a lot of overlap in the data to be fetched and the recursion stops at the topmost level. This is the best case and typically happens for low-motion regions of the frame. We see that in this case both the bandwidth and the memory requirement are low. In FIG. 4, we depict a case where the overlap region at topmost level ($RO_{20}$) exceeds the threshold for level 2. Intuitively this means that the method says that if we try to get the reference data in 1 chunk it will be inefficient as it will contain lot of data that is not required to be fetched. Thus in this case, the recursion is invoked and the method moves to next level. At next level the method works on two sub-regions separately.

It finds out the overlap regions for each of the sub-regions ($RO_{10}$ and $RO_{11}$). Here it seems that region $RO_{11}$ is below the threshold for level 1 and thus is fetched as a single region. However for $RO_{10}$ we see that it exceeds the threshold for level 1 and hence the recursion is invoked once again.

Intuitively, it is the way by which method says that motion vectors belonging to B0 and B1 are outliers and should be handled separately, whereas for B2 and B3 there is sufficient overlap and hence for B2 and B3 data should be fetched as one region. At the lowest level the regions cannot be sub-divided and are fetched as the reference regions for each of B0 and B1 separately.

$L=2, N_2=1, r=[0], \{B_{1ri}\}=\{B_{20i}\}[B0,B1,B2,B3]$ $L=1, N_1=2, r=[0,1], \{B_{10i}\}=[B0,B1], \{B_{11i}\}=[B2,B3]$

In the above scenario: $RO_{20}<T_2$ and hence the recursion stops at highest level (L=2) RegToBeFetched=[$RO_{20}$]

This is reflected in FIG. 3, wherein there is a lot of overlap in data to be fetched.

Thus by working at different levels MV-analysis tries to find the overlap in the data to be fetched for different sized regions. In this way it is able to remove some of the outlier motion vectors from the rest and hence results in a more robust fetch strategy.

$L=2, N_2=1, r=[0], \{B_{1ri}\}=\{B_{20i}\}[B0,B1,B2,B3]$ $L=1, N_1=2, r=[0,1], \{B_{10i}\}=[B0,B1], \{B_{11i}\}=[B2,B3]$

In the above scenario: $RO_{20}>T_2$ and hence the recursion moves to level 1.

On Level 1:
$RO_{11}>T_1$ and hence $RO_{11}$ will be fetched
$RO_{10}<T_1$ and hence recursion moves to level 0. On level 0 the sub-regions are same as B0 and B1 (smallest unit) and hence the reference regions associated with B0 and B1 will be fetched.

RegToBeFetched=[$RO_{11}$, $\hat{R}_{100}$(Ref Region for B0), $\hat{R}_{101}$ (Ref Region for B1)]

This is reflected in FIG. 4, wherein recursion is invoked.

MV Analysis and Dynamic Batch Sizes

In a multi-core platform a key concept is the concept of 'batch' of data. Different cores perform different tasks on different chunks of data called a 'batch' of data. If the tasks are partitioned appropriately then the cores need to do synchronization and exchange data only once per batch. Frequent synchronization can lead to significant overheads and hence it is advisable to have a not-very-small batch size. Larger batch sizes imply 'small variability' in processing requirement (as the amount of processing required is data dependent) thus leading to smaller synchronization stalls. On the other hand a smaller batch size implies reduced memory requirement (output and input buffers depend directly on the batch size). Since the cores are operating on a 'batch' of data, a 'batch' also forms the natural highest level for the MV-Analysis method.

Thus the on-chip memory requirement for the MV-analysis method is defined by the batch size. The on-chip memory for a given batch size has to be allocated according to the worst case requirement for the given batch size. However the amount of data to be fetched will vary and will be much below the worst case requirement most of the times. To optimize the usage of on-chip memory dynamic batch sizes are used. The amount of reference data to be fetched is variable but this information is available as an output of MV-Analysis method. We make use of this information to vary the batch sizes thus leading to 'dynamic batch sizes'. As an example let us assume that the memory has been reserved for a batch size of 2 macro-blocks. The memory allocated is always for the worst case requirement for that batch size. However most of the times worst case will not happen and lot of memory will go un-used. By dynamically increasing the batch sizes we'll be able to utilize the allocated memory properly and result in a higher average batch size.

H.264 Decoder Implementation Based on MV-Analysis and Dynamic Batch Sizes

Figure 5:
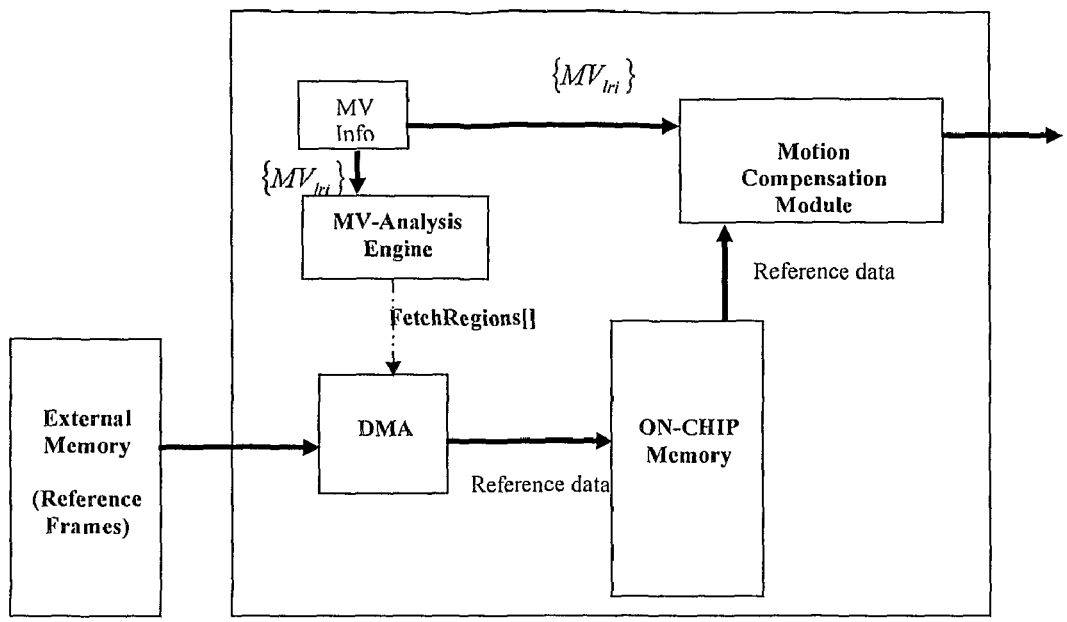
FIG. 5 shows motion compensation module implementation system.
Figure 6:
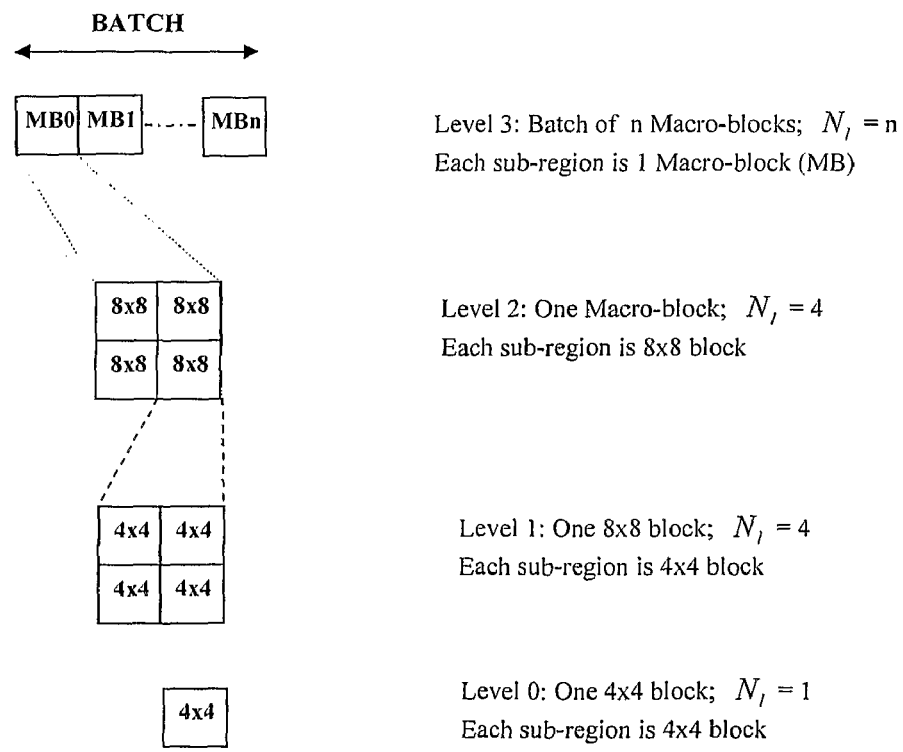
FIG. 6 shows levels and region partitions for MV-analysis implementation for 1-1.264 decoder.

MV analysis and dynamic batch sizes have been used in the implementation of motion compensation module for the H.264 decoder. A block diagram of different modules involved and their interactions is shown in FIG. 5 and Levels and region partitions for MV-Analysis implementation for H.264 decoder is shown in FIG. 6.

.Reference data is fetched from external memory using an on-chip DMA. The DMA is set-up for the transfers by MV-Analysis engine and a separate DMA transfer is setup for each of the reference region specified by FetchRegions[ ] array. To reduce the processor stalls that might be introduced due to setting up of DMA transfers it is most necessary to issue all the transfer requests simultaneously. DMA might process the transfer requests sequentially but from the processor it should appear as if all the regions are being fetched in one request. This implies that DMA should be able to handle multiple simultaneous requests and more importantly is should have the capacity to absorb all the fetch requests that a batch might need. MV-analysis thresholds are critical parameters and have to be tuned accordingly to balance the bandwidth requirements and the allowed simultaneous number of fetches.

MV-Analysis Region Partitioning for H.264

A 4×4 is the smallest data block for which a motion-vector is available it forms the lowest level for which reference data will be fetched from the external memory. Usually the 'Batch' includes multiple macro-blocks and this implies 4 levels of data on which data fetches will be issued.

We claim:

1. A method of optimizing bandwidth requirements and on-chip memory usage by Dynamic Motion Vector Analysis for motion compensation based video decoder systems, said method comprising the steps of:
   a) providing regions of a frame for which data is to be fetched;
   b) identifying reference regions of a previous frame stored in an external memory, and pre-processing the motion vectors to determine reference data fetches of multiple reference regions from the previous frame;
   c) identifying a smallest overlap region for each of the reference data;
   d) comparing a size or the overlap region with a predetermined threshold; and
   e) fetching the regions having the size of the overlap region less than the threshold and dividing the regions having the size of the overlap region greater than the threshold into sub-regions, and repeating the steps b) to e) until each region cannot be further sub-divided.

2. The method as claimed in claim 1, wherein a size and a number of the regions depend upon a set of predetermined thresholds.

3. The method as claimed in claim 1, wherein the method provides for means to trade-off between external interface bandwidth requirement and the number of data fetches for a given amount of on-chip memory in a system.

4. The method as claimed in claim 1, wherein the set of thresholds and region partitioning strategy are adaptable to the application data processed.

5. The method as claimed in claim 1, wherein the method dynamically changes operating batch sizes as per a requirement.

6. The method as claimed in claim 1, wherein the method provides a dynamic balance between external memory interface bandwidth requirement and on-chip memory requirement.

7. The method as claimed in claim 5, wherein the batch comprises a plurality of macro-blocks.

8. The method as claimed in claim 1, wherein the regions and the sub-region are rectangular blocks of data in a picture frame.

9. The method as claimed in claim 1, wherein the method automatically decides and fetches the referencing data from previous frames under multiple scenarios selected from a group comprising:
 a) current data blocks referencing overlapping data from previous frames;
 b) current data blocks referencing non-overlapping regions; and
 c) current data blocks referencing regions from multiple reference frames.

10. The method as claimed in claim 1, wherein the method is implemented onto a single core and/or multi-core embedded platform.

11. An apparatus to optimize bandwidth requirements and on-chip memory usage by Dynamic Motion Vector Analysis for a motion compensation based video decoder system, said apparatus comprising:

a) means for providing motion vector information to determine regions for which data is to be fetched;
b) means for providing Dynamic Memory Access (DMA) to fetch reference data from external memory and to process the transfer requests sequentially;
c) motion vector analysis engine to perform:
 i. identifying reference regions of a previous frame from the regions stored in an external memory using motion vectors, and preprocessing the motion vectors to
 determine reference data fetches of multiple reference regions from the previous frame;
 ii. identifying a smallest overlap region for each of the reference data;
 iii. comparing a size of the overlap region with a predetermined threshold; and
 iv. fetching the regions having the size of the overlap region less than the threshold and dividing the regions having the size of the overlap region greater than the threshold into sub-regions. and repeating the steps from i to iv until each region cannot be further subdivided;
d) a motion compensation module to transfer the fetched reference data to an on-chip memory; and
e) the on-chip memory to store the reference data.

12. The apparatus as claimed in claim 11, wherein the apparatus is part of motion compensation module of an H.264 decoder.

* * * * *